United States Patent Office 2,728,804
Patented Dec. 27, 1955

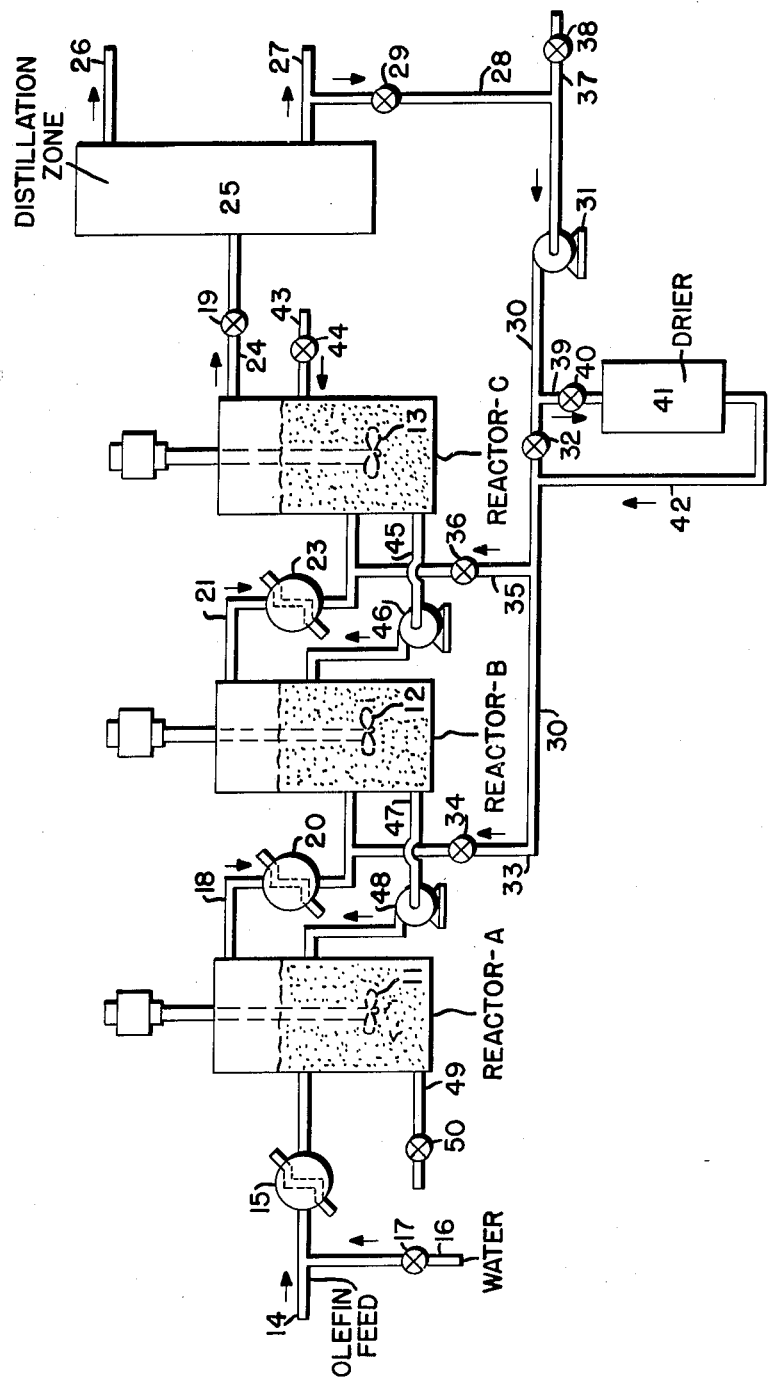

2,728,804
MULTI-STAGE POLYMERIZATION PROCESS

Robert H. Mueller, North Plainfield, N. J., assignor to Esso Research and Engineering Company, a corporation of Delaware Application November 1, 1952, Serial No. 318,189

7 Claims. (Cl. 260—683.15)

This invention relates to a process for multi-stage polymerization of olefins employing a suspended polymerization catalyst. More particularly, it relates to a continuous, non-regenerative, multi-stage polymerization process in which normally gaseous olefins are polymerized to normally liquid polymers employing a solid, finely divided phosphoric acid catalyst maintained as an agitated suspension in the olefinic hydrocarbons at relatively high pressure conditions.

Olefins are usually polymerized to relatively low molecular weight polymers suitable for inclusion in motor gasolines and for other uses by passing them through a fixed bed of solid, granular catalyst, such as solid phosphoric acid. The polymerization reaction is highly exothermic, and difficulty has been experienced with controlling reaction zone temperatures, catalyst bed plugging, catalyst replacement, maintaining proper water of hydration levels, etc., in the tubular-type reactors.

These limitations on the prior art processes are overcome or minimized by continuous polymerization of olefins in the presence of a finely divided, solid phosphoric acid catalyst that is maintained as a dense suspension in a dense hydrocarbon phase comprising the olefins. The reactants and catalyst are agitated in order to obtain uniform distribution and suspension of the catalyst, to achieve heat balance within the reaction zone, and to maintain uniform temperature throughout the reaction zone. Heat control offers little difficulty even with feeds containing relatively high olefin concentrations, and substantially isothermal reaction conditions exist in the zone. This process is non-regenerative, i. e., the catalyst is used for long periods of time until spent, and fresh make-up catalyst is readily added to the reaction zone to replace withdrawn spent catalyst without having to discontinue operations.

The suspension polymerization technique is advantageously conducted in several stages operating in series. Since equilibrium olefin concentrations exist throughout each well-mixed zone, it is difficult to achieve high olefin conversions in a single stage. Multi-stage operation permits high olefin conversions to be obtained even when using feeds containing relatively high olefin concentrations.

This multi-stage operation, however, presents difficulties with respect to maintenance of the proper degree of water of hydration in the various stages. Thus, in a typical operation, olefin feed to the first stage is hydrated such that the partial pressure of water in the first reactor is balanced by the catalyst vapor pressure. The effluent from the first stage, which includes polymerized olefins, then goes to the second stage for further polymerization. This additional polymerization results in fewer mols of hydrocarbon in the second stage, for a given number of mols of water, than there were in the first stage. Since the number of mols of water remains constant in each subsequent stage, the mol fraction, and thus the partial pressure, of the water progressively increases in the second and subsequent stages. The water partial pressure is too high in any stage after the first stage, and the catalyst in these latter stages becomes overhydrated. This causes the catalyst to agglomerate into lumps or to cake, or otherwise to lose activity prematurely. If water addition is such that any subsequent stage is correctly hydrated, the catalyst in previous stages will lose free acidity and activity because of underhydration. This problem becomes more serious the higher the olefin content of the feed since the relative change in mols of hydrocarbon becomes more pronounced. It is also correspondingly more serious when using catalysts sensitive to overhydration, such as the silica gel base catalysts.

In accordance with the present invention, the foregoing difficulties are largely overcome by the following expedient. A substantially constant and correct amount of water of hydration is maintained in the first stage and additional dry hydrocarbon is added to each subsequent stage, along with the total effluent from a preceding stage, whereby the water partial pressure and catalyst vapor pressure are substantially balanced. Therefore, compensation is made for the molal shrinkage occurring in each subsequent reaction zone due to olefin polymerization. When employing this expedient, each reaction zone may be operated at approximately the same reaction temperature and pressure.

This mode of operation permits the polymerization reaction to be carried out with feeds containing relatively high olefin contents, such as above about 45 to 80% or higher, with good activity and life maintenance for even the very sensitive catalysts. Furthermore, it avoids the necessity of resorting to expensive and difficultly controlled procedures, such as partial dehydration of the effluent between stages, or complete dehydration of the effluent followed by rehydration to the desired level between adjacent reaction zones.

The present invention will now be explained in detail in connection with the sole figure that illustrates a simplified flow plan of a preferred embodiment thereof.

Turning now to the drawing, three reaction zones, A, B, and C, are shown connected in series. Each reaction zone is provided with agitating means, such as propellers 11, 12 and 13, controlled by prime movers exterior to the zone. Each zone likewise contains a dense bed of finely divided, solid phosphoric acid suspended in fluid hydrocarbon. The agitating means help maintain uniform reaction conditions in the zones and keep the catalyst in suspension. By proper control of conditions, the catalyst may be maintained as a dense phase in the lower portions of the reaction zones with a substantially catalyst-free hydrocarbon phase in the upper portion of each zone. Each reaction zone is preferably operated at the same pressure and temperature as will be explained hereinafter.

The numeral 14 designates an olefin feed conduit fluidly communicating with reactor A. Conduit 14 includes a feed preheater 15 for heating the olefin feed up to any desired temperature level before it enters the reaction zone. Preferably, the feed will be preheated to a temperature such that the sensible heat of the feed up to the reaction zone temperature will substantially balance the exothermic heat of reaction evolved in the zone during polymerization.

Hydration water is conveniently introduced into the feed through branch line 16 containing control valve 17. The amount of water introduced with the feed should be such that its partial pressure in reactor A will substantially exactly balance the catalyst vapor pressure under the equilibrium reaction conditions existing in this zone. If desired, the water may be introduced in vapor or liquid form directly into reactor A. Another convenient mode consists of passing a portion or all of the olefin feed through a water saturator under suitable conditions whereby the feed dissolves enough water to meet the above requirements.

The olefin feed contacts the catalyst in reactor A under suitable temperature, pressure and contact time conditions whereby substantial polymerization of olefin takes place. Substantially solid-free effluent is continuously withdrawn from the upper portion of reactor A by means of line 18 containing heat exchange means 20. Line 18 communicates with the catalyst phase in reactor B. The temperature level in reactor B will be substantially the same as that in reactor A. Therefore, the effluent temperature will be adjusted in heat exchange means 20 whereby its sensible heat up to the reaction temperature will balance exothermic heat evolved in reactor B. Generally, the effluent will have to be cooled in means 20.

Additional polymerization takes place in reactor B. Substantially solid-free effluent is withdrawn from this reactor by means of line 21 containing heat exchange means 23, and is introduced into reactor C. Reactor C will likewise operate at substantially the same temperature as reactor B to obtain balanced conditions. Necessary adjustments in effluent temperature are made in heat exchange means 23.

The desired overall olefin conversion level is attained in reactor C. Effluent including polymerized olefins is continuously withdrawn through conduit 24 containing valve 19 and sent to a separation means 25, such as a conventional distillation zone or the like, for recovery of the product. If desired, the effluent leading to zone 25 may be filtered or subjected to other separation means to remove any entrained solid materials before it enters the fractionation zone. The effluent will be separated into normally gaseous materials, such as paraffins and unreacted olefins, which are withdrawn through line 26. A polymer product stream is withdrawn through line 27.

A portion of the polymer stream may be withdrawn from line 27 through branch line 28 containing valve 29 and introduced into line 30 including pump 31 and control valve 32. A portion of the polymer stream is passed through branch line 33 containing valve 34 which is fluidly connected to line 18. This recycled polymer stream therefore combines with the effluent from reactor A and is introduced into reactor B. The amount of polymer passing through line 33 will be substantially equal to the total number of mols of hydrocarbon lost in reactor B through polymerization whereby the total mols of hydrocarbon in reactor B will be substantially the same as the total mols of hydrocarbon in reactor A.

Likewise, a portion of the recycled polymer is withdrawn from line 30 through branch line 35 containing control valve 36, this line being fluidly connected to effluent line 21. The proper amount of polymer is thus introduced into reactor C such that allowance is made for hydrocarbon molal shrinkage in this zone. Suitable control devices may be used for controlling the amount of hydrocarbons going into each of the reaction zones B and C by means that will be apparent to one skilled in the art.

Although it is generally preferred to recycle a portion of the polymer product to the subsequent reaction zones in the manner shown, other hydrocarbon streams may be employed to obtain comparable results. For example, a suitable hydrocarbon stream may be introduced into line 30 through line 37 containing control valve 38, this stream being divided and passed through branch lines 33 and 35 by the procedure described above. If an extraneous hydrocarbon stream is used, it should be substantially inert to reaction in the presence of the solid phosphoric acid catalyst. For this reason, predominantly paraffinic and naphthenic hydrocarbon streams are preferred. Olefinic streams will be polymerized to some extent by the catalyst thereby upsetting the equilibrium conditions existing in the various zones. If the hydrocarbon stream contains susbtantial amounts of aromatic hydrocarbons, some alkylation of the aromatics will occur, this is not desirable. The extraneous hydrocarbons may consist of substantially paraffinic normally gaseous paraffins, such as $C_2$–$C_5$ streams, naphtha streams, kerosene fractions, gas oil fractions, lubricant distillates and the like that are substantially inert to the catalyst. In any case, it will be necessary only to know the approximate average molecular weight of the hydrocarbons in the stream in order to introduce the correct number of the mols into the reaction zones.

The hydrocarbon stream introduced through line 30 shuld be substantially free of water, in order not to alter the water content in any zone in an appreciable amount. This stream may therefore be dried by passing it, by means of line 39 containing control valve 40, through drying zone 41. The dry hydrocarbon stream may then be passed by line 42 into line 30 from which it may be directed to the reaction zones as described above. Passage of the hydrocarbon through zone 41 is readily controlled by suitable adjustment of valves 32 and 40.

Dryer 41 may include a fixed bed of adsrobent solid such as anhydrous alumina or Porocel, silica gel or other drying agents well known to the art. This drying operation will generally be required only in the case of refinery streams that contain sufficient water to be harmful in the practice of the present invention. The polymer stream withdrawn from zone 25 through line 27 should of course be passed through the drier if necessary.

Since it is desired to maintain overall olefin conversions at above about 85%, it will be necessary to add fresh catalyst either continuously or intermittently. In order to attain the most effective utilization of the catalyst, it will be preferred to have the flow of catalyst countercurrent to that of fresh feed. This may be done by charging a slurry of fresh catalyst in polymer or other liquid hydrocarbon through line 43 containing valve 44 into the upper portion of the dense catalyst phase in reactor C. Suspended catalyst may be withdrawn from the bottom portion of reactor C through line 45, and pumped through pump 46 to the upper portion of the dense catalyst phase in reactor B. Likewise suspended catalyst may be withdrawn from reactor B through line 47 and pumped through pump 48 into the upper portion of the dense catalyst bed in reactor A. Spent catalyst is withdrawn from reactor A through line 49 containing valve 50 and discarded.

The system has been described in connection with stirred reaction zones. It is equally applicable, however, to systems in which the catalyst is maintained in suspension in hydrocarbon by passing olefin feed upwardly therethrough, by recycling and jetting a portion of the effluent back into the suspension for agitation purposes, or by other means that are known to the art.

Although a multi-stage polymerization system has been shown employing three reactors, it will be obvious that 2, 4 or even more reactors in series may be used effectively to obtain high olefin conversions and long catalyst life.

The catalyst used in the practice of the present invention is preferably one comprising phosphoric acid deposited on a siliceous support such as silicia gel kieselguhr, and the like. The catalyst will usually contain from about 50 to 90% phosphoric acid by weight and preferably from 75% to 85% by weight phosphoric acid in order to obtain effective olefin conversions. This invention has particular application to silica gel-base catalysts since these materials are so extremely sensitive to under- or over-hydration conditions. The fresh catalyst may have a size in the range of 20 to 200 mesh or higher, preferably larger than 100 mesh; however, some attrition of catalyst will occur during the reaction and particles as fine as 300 mesh, or finer, will be formed. The term "finely divided, solid phosphoric acid catalyst" refers herein to catalysts of such sizes.

The polymerization temperature will usually be in the range of about 300 to 600° F.; however, temperatures of from about 425 to 525° F. will be preferred in order to obtain high olefin conversions and to minimize the formation of carbonaceous material on the catalyst. Pressures in the range of about 450 to 1500 p. s. i. g. or higher should be used. Pressures are preferably maintained above about 900 p. s. i. g. Under these conditions a single, highly dense hydrocarbon fluid phase exists which is conducive to high olefin conversions because of increased contact time, to ease of maintenance of catalyst in suspension, and to a continuous washing action on the catalyst which is beneficial in prolonging the active life of the catalyst.

It is generally desired that an olefin conversion of at least 75% be attained in the reaction zones with preferable conversion levels of about 85%. It will usually be necessary, under the temperature and pressure conditions prevailing, to employ space velocities in the range of about 0.1 to 2.5 gallons of feed per hour per pound of catalyst (G./H./P.).

In carrying out the process of this invention, it will first be desirable to determine the reaction conditions that are needed to achieve the desired olefin conversion in the reaction zones when employing a particular olefin feed and a specific catalyst. The temperature level, which is maintained substantially constant in all zones, will be one that will give partial but substantial olefin conversion in the first stage, and that will give a favorable relationship between overall olefin conversion and catalyst life. The vapor pressure characteristics of the catalyst at the reaction temperature level is also determined, and the proper amount of water of hydration is introduced into the first reaction zone to give balanced conditions in that zone. After reaction conditions have been established in each zone, extraneous inert hydrocarbon is introduced into each subsequent stage in the needed amount to compensate for molal shrinkage in each stage. The needed amount of extraneous hydrocarbon is readily computed after the extent of olefin conversion in each subsequent reaction zone is determined.

In a typical operation, a $C_3$ feed containing 50% propylene is polymerized in three stages operating in series with a silica gel base catalyst (80% $H_3PO_4$–20% $SiO_2$) in each stage. The reaction pressure in each stage is 1000 p. s. i. g. $C_9$ polymer is the predominant product. The effluent from the final stage is fractionated to recover the polymer product, a portion of which is recycled to the second and third stages.

A reaction temperature of 450° F. is selected for each stage, at which temperature olefin conversion is about 50% in the first stage. At this temperature, the catalyst vapor pressure is approximately 160 mm. mercury (Hg). Since the equilibrium concentration of hydrocarbons in the first reaction zone is known, it is readily determined by conventional calculations that the olefin feed must contain about 0.19 mol per cent water in order to give a balancing partial pressure of water in the first stage of 160 mm. Hg.

The second stage is operated to give an additional 25% conversion of the olefins. The equilibrium reaction mixture in this stage consequently contains fewer mols of hydrocarbon and a higher mol percent water than that in the first stage. About 8 mols of extraneous dry polymer, per 100 mols of feed, must be added to this zone to maintain the total mols of hydrocarbon at a constant level and to keep balanced catalyst vapor and water partial pressures.

The third stage is operated to give an additional olefin conversion of 14% to obtain an over-all conversion of 89%. It is necessary to add only about 5 mols extraneous dry polymer, per 100 mols of feed, to this zone to maintain balanced conditions.

This mode of operation is also particularly useful in countercurrent flow of olefin feed and catalyst in which fresh catalyst is introduced into the final stage. It is particularly important to avoid overhydration of fresh catalysts inasmuch as they are more sensitive to overhydration than are the partially used catalysts. The introduction of extraneous hydrocarbon into the last stage will therefore prevent overhydration of the fresh catalyst, and the amount of extraneous hydrocarbon introduced can be gradually decreased as the catalyst ages and becomes more insensitive to overhydration.

The amount of extraneous hydrocarbon introduced into any of the stages after the first will depend entirely on the extent of conversion in each individual stage, particularly if substantially constant reaction temperatures and pressures are used in each stage. As a rule, the reaction will be conducted such that dimers and trimers of the particular olefin will predominate. Thus for each mol of polymer formed, the loss in total mols of hydrocarbon will usually vary from 1 to 2 and make-up hydrocarbon will be added as needed. In the event the reaction is continued to produce higher molecular weight polymers such as tetramers, a correspondingly higher amount of the extraneous hydrocarbon will be needed. The addition of inert hydrocarbons in the reaction zones as proposed by this invention will not impair to any appreciable degree the equilibrium operating conditions being maintained in each zone. It may be desirable in some cases, however, to make minor adjustments in reaction temperatures, contact times and the like in the individual zones in order to maintain desired conversion levels.

The amount of water injected into the first reaction zone will depend almost entirely on the nature of the catalyst and the reaction temperature in this zone. Generally, in the range of about 0.1 to 2 gallons of water per 1000 gallons of olefin feed will be suitable for the conventional solid phosphoric acid catalysts.

The extent to which olefin conversion is increased from stage to stage will vary depending on the number of stages employed and the total over-all conversion desired. If only two stages are used, conversion in the first stage will usually be at least about 60 to 70%. With more stages, first stage conversion might be 40 to 60% or so, with successively decreasing conversions in subsequent stages, until an over-all conversion of 80 to 95%, or even higher, is obtained.

It will be obvious to the skilled workman that the present invention may be used under a wide range of conditions and with a variety of olefins without departing from the spirit and scope thereof.

What is claimed is:

1. A continuous, non-regenerative catalytic process for polymerizing olefins which comprises he steps of maintaining a well mixed suspension of finely divided solid phosphoric acid catalyst in fluid hydrocarbon in a plurality of reaction zones connected in series, each of said zones being maintained at olefin polymerization conditions, introducing olefin feed into the first of said zones maintained at a temperature whereby substantial olefin conversion occurs, introducing sufficient water into said first zone whereby its partial pressure substantially equals the vapor pressure of said catalyst, withdrawing effluent including unreacted olefins and water from the first of any two adjacent reaction zones and introducing it into the second of said adjacent zones, polymerizing a substantial portion of unreacted olefins in each of said reaction zones, and introducing substantially dry extraneous hydrocarbon into each subsequent reaction zone after said first zone, the amount of said extraneous hydrocarbon being sufficient to maintain the water partial pressure and catalyst vapor pressure substantially equal in each of said subsequent zones.

2. A process as in claim 1 wherein reaction temperatures in each of said zones are substantially constant.

3. A process as in claim 2 wherein the amount of said extraneous hydrocarbon is such that the total mols of hydrocarbon in each of said zones remains substantially constant.

4. A process as in claim 3 wherein said catalyst is a silica gel base catalyst.

5. A process as in claim 4 wherein said extraneous hydrocarbon is polymer recovered from the effluent from the last of said zones.

6. A process as in claim 1 wherein said extraneous hydrocarbon is substantially inert to reaction in the presence of said catalyst.

7. A process as in claim 1 wherein catalyst is passed from zone to zone in a direction countercurrent to the flow of said effluents, spent catalyst being withdrawn from the first of said zones and make-up catalyst being introduced into the last of said zones.

References Cited in the file of this patent

UNITED STATES PATENTS

| | | |
|---|---|---|
| 2,291,216 | Gerhold | July 28, 1942 |
| 2,559,576 | Johnstone | July 3, 1951 |
| 2,626,289 | Russell | Jan. 20, 1953 |

FOREIGN PATENTS

| | | |
|---|---|---|
| 663,080 | Great Britain | Dec. 19, 1951 |